US010584896B2

(12) United States Patent
Wilson et al.

(10) Patent No.: US 10,584,896 B2
(45) Date of Patent: Mar. 10, 2020

(54) HVAC FURNACE CONDENSATE REMOVAL SYSTEM

(71) Applicant: Johnson Controls Technology Company, Plymouth, MI (US)

(72) Inventors: Stephen C. Wilson, Norman, OK (US); John T. Knight, Moore, OK (US)

(73) Assignee: Johnson Controls Technology Company, Auburn Hills, MI (US)

( * ) Notice: Subject to any disclaimer, the term of this patent is extended or adjusted under 35 U.S.C. 154(b) by 300 days.

(21) Appl. No.: 15/640,240

(22) Filed: Jun. 30, 2017

(65) Prior Publication Data

US 2018/0031275 A1 Feb. 1, 2018

Related U.S. Application Data

(60) Provisional application No. 62/369,545, filed on Aug. 1, 2016.

(51) Int. Cl.

| | |
|---|---|
| *F24H 8/00* | (2006.01) |
| *F24F 13/22* | (2006.01) |
| *C25B 1/04* | (2006.01) |
| *F24H 9/16* | (2006.01) |
| *F24H 9/20* | (2006.01) |
| *F24F 3/00* | (2006.01) |
| *F24F 1/00* | (2019.01) |
| *F24F 5/00* | (2006.01) |
| *F24F 11/63* | (2018.01) |
| *F24D 5/00* | (2006.01) |

(52) U.S. Cl.
CPC ............... *F24H 8/006* (2013.01); *C25B 1/04* (2013.01); *F24F 1/00* (2013.01); *F24F 3/001* (2013.01); *F24F 5/00* (2013.01); *F24F 11/63* (2018.01); *F24F 13/22* (2013.01); *F24H 9/16* (2013.01); *F24H 9/2085* (2013.01); *F24D 5/00* (2013.01); *F24D 2200/123* (2013.01); *F24F 2013/228* (2013.01); *F24F 2221/34* (2013.01)

(58) Field of Classification Search
None
See application file for complete search history.

(56) References Cited

U.S. PATENT DOCUMENTS

| | | | | |
|---|---|---|---|---|
| 5,170,637 | A | * | 12/1992 | Shyu .................. F24F 3/12 204/242 |
| 6,675,795 | B2 | | 1/2004 | Videto et al. |
| 6,684,878 | B2 | | 2/2004 | Ho et al. |
| 6,796,250 | B1 | | 9/2004 | Greene |

(Continued)

FOREIGN PATENT DOCUMENTS

| | | |
|---|---|---|
| CN | 102828200 A | 12/2012 |
| EP | 1715265 A1 | 10/2006 |

(Continued)

*Primary Examiner* — Harry D Wilkins, III
(74) *Attorney, Agent, or Firm* — Fletcher Yoder, P.C.

(57) ABSTRACT

A heating, ventilating, and air conditioning (HVAC) furnace includes a condensing furnace and a condensate removal system associated with the condensing furnace. The condensate removal system includes an electrolyzer having a container that may collect a condensate generated from an exhaust gas produced in the condensing furnace and an electrode disposed within the container and that may apply an electric current to the condensate to electrolyze the condensate and thereby generate condensate gases.

26 Claims, 7 Drawing Sheets

(56) References Cited

U.S. PATENT DOCUMENTS

| 8,152,973 | B2 | 4/2012 | Yamamoto et al. |
| 2008/0047830 | A1* | 2/2008 | Fairfull .................... C25B 1/06 204/276 |
| 2011/0155567 | A1 | 6/2011 | Sim et al. |
| 2013/0108971 | A1 | 5/2013 | Maiello et al. |

FOREIGN PATENT DOCUMENTS

| JP | 4789986 | B2 | 10/2011 |
| JP | 4789988 | B2 | 10/2011 |
| RO | 129399 | A2 | 4/2014 |
| TW | M333418 | | 6/2008 |
| WO | 2011066841 | A1 | 6/2011 |
| WO | 2016062804 | A2 | 4/2016 |

* cited by examiner

HVAC FURNACE CONDENSATE REMOVAL SYSTEM

CROSS REFERENCE TO RELATED APPLICATION

This application benefits from the priority of U.S. Provisional Patent Application No. 62/369,545, entitled "Condensate Removal for Gas Furnace for an HVAC Rooftop Unit," filed Aug. 1, 2016, which is hereby incorporated by reference in its entirety.

BACKGROUND

The present disclosure relates generally to environmental control systems, and more particularly, to a condensing furnace for environmental control systems.

Environmental control systems are utilized in residential, commercial, and industrial environments to control environmental properties, such as temperature and humidity, for occupants of the respective environments. The environmental control system may control the environmental properties through control of an airflow delivered to the environment. For example, a heating, ventilation, and air conditioning (HVAC) system may route the airflow through a condensing furnace having multiple heat exchangers prior to delivery to the environment. The heat exchangers absorb heat from the exhaust to heat the airflow. The use of multiple heat exchangers increases the overall efficiency of the condensing furnace due, in part, to recovery of a substantial amount of heat from the exhaust. Extraction of the heat from the exhaust gas by multiple heat exchangers may result in condensation of moisture from the exhaust gas. The condensed moisture is removed from the HVAC system via a drainage system. However, certain environmental conditions may affect removal of the condensed moisture through the drainage system. For example, in cold weather conditions when the temperature is at or below 0° Celsius (C) (32° Fahrenheit (F)), the condensed moisture may solidify (e.g., freeze) within the drainage system. This may result in blockage of the drainage system, thereby affecting operation of the HVAC system.

SUMMARY

In one embodiment, a heating, ventilating, and air conditioning (HVAC) furnace includes a condensing furnace and a condensate removal system associated with the condensing furnace. The condensate removal system includes an electrolyzer having a container that may collect a condensate generated from an exhaust gas produced in the condensing furnace and an electrode disposed within the container and that may apply an electric current to the condensate to electrolyze the condensate and thereby generate condensate gases.

In a second embodiment, a heating, ventilating, and air conditioning (HVAC) system includes a condensate removal system associated with a condensing furnace of the HVAC system and having an electrolyzer. The electrolyzer include container having an inlet and an outlet. The inlet may allow the container to collect a condensate generated within a section of the condensing furnace having a heat exchanger. The electrolyzer also includes an electrode disposed within the container and that may apply an electric current to the condensate. The electric current may decompose the condensate to generate condensate gases and the outlet of the container allows discharge of the condensate gases from the container.

In a third embodiment, a method includes directing a condensate to a condensate removal system associated with a condensing furnace of a heating, ventilating, and air conditioning (HVAC) rooftop unit. The condensate is generated from cooling an exhaust gas produced from combustion of a fuel within a burner of the condensing furnace. The condensate removal system includes an electrolyzer having a container and an electrode and the container may collect the condensate. The method also includes applying an electric current to the condensate in the container using the electrode to decompose the condensate and thereby generate condensate gases and releasing the condensate gases from the container.

DETAILED DESCRIPTION

Embodiments of the present disclosure are directed toward a condensing furnace for heating, ventilating, and air conditioning (HVAC) systems. As will be appreciated, condensate generated in the condensing furnace of a rooftop unit in HVAC systems may be difficult to remove when outdoor temperatures are at or below freezing temperatures (e.g., less than or equal to approximately 0° C. (32° F.)). For example, existing rooftop units for HVAC systems include multiple heat exchangers that recover heat from an exhaust gas generated in the condensing furnace. By using multiple heat exchangers to recover heat from the exhaust, the condensing furnace may operate at 82-84% efficiency or more. Cooling the exhaust gas using multiple heat exchangers may result in condensation of moisture from the exhaust gas. The condensed moisture is collected and drained from the rooftop unit using a drainage system that includes drainage pipes that direct the collected condensate to a drain that is separate from the HVAC system for disposal of the condensate. Portions of the drainage system, in particular the drainage pipe, may be exposed to ambient conditions surrounding the rooftop unit. For example, the drainage pipe may be exposed to ambient temperatures that may affect effective removal of the condensate from the HVAC system. For example, during cold weather, ambient temperatures may be at or below a freezing temperature of the condensate (e.g., temperatures less than or equal to 0° C.). As such, the condensate may solidify within the drainage pipes or other drainage system component, thereby blocking removal of the condensate through the drainage pipe. Blockage of the drainage system may rupture certain components of the drainage system (e.g., the trap and/or drainage pipes) and affect the overall operation of the HVAC system. Insulation tape or foam may be used to cover the drainage pipes and other components of the drainage system to mitigate freezing of the condensate. However, the insulation tape or foam may not be sufficient to maintain the temperature of condensate above a freezing temperature in certain locations and/or weather conditions. Additionally, it may be desirable to increase the efficiency of the condensing furnace to 90% or more. However, operating the condensing furnace at 90% efficiency or more may generate a substantial amount of condensate. Existing condensing furnaces generally do not include condensate removal features suitable for removing the amount of condensate generated when the condensing furnace is operated at an efficiency of 90% or more. Accordingly, it is now recognized that there is a need to develop a condensate removal system that removes condensate from condensing furnaces used in HVAC systems without the use of drainage pipes and that is suitable for use in cold weather conditions.

With the foregoing in mind, it is presently recognized that the condensate may be removed using electrolysis. Electrolysis is a process that may be used to decompose (e.g., split) water molecules ($H_2O$) into hydrogen ($H_2$) gas and oxygen ($O_2$) gas using an electric current. By decomposing water in the condensate into $H_2$ and $O_2$ gas, drainage pipes may not be necessary to drain the liquid condensate from the rooftop unit because $H_2$ and $O_2$ gases may be released from the rooftop unit through a gas vent. As such, present embodiments are directed toward a condensate removal system that includes an electrolyzer that may be used to remove the condensate (e.g., water ($H_2O$)) via electrolysis. As discussed in further detail below, the electrolyzer includes one or more electrodes that may be used to apply an electric current to the condensate at a voltage that is suitable for electrolysis of water molecules in the condensate to produce hydrogen ($H_2$) gas and oxygen ($O_2$) gas. The gases generated from electrolysis of the water in the condensate may be released from the condensate removal system without the use of a drainage piping system. Accordingly, the disclosed condensate removal system may mitigate problems associated with freezing of condensate in drainage pipes and other drainage system components. Further, while described primarily in the context of a rooftop condensing furnace, the condensate removal systems described herein may be applicable to a number of HVAC or similar systems that generate water as a condensate, including commercial applications (e.g., self-contained commercial units) and residential applications (e.g., residential cooling systems with condensers).

Figure 1:
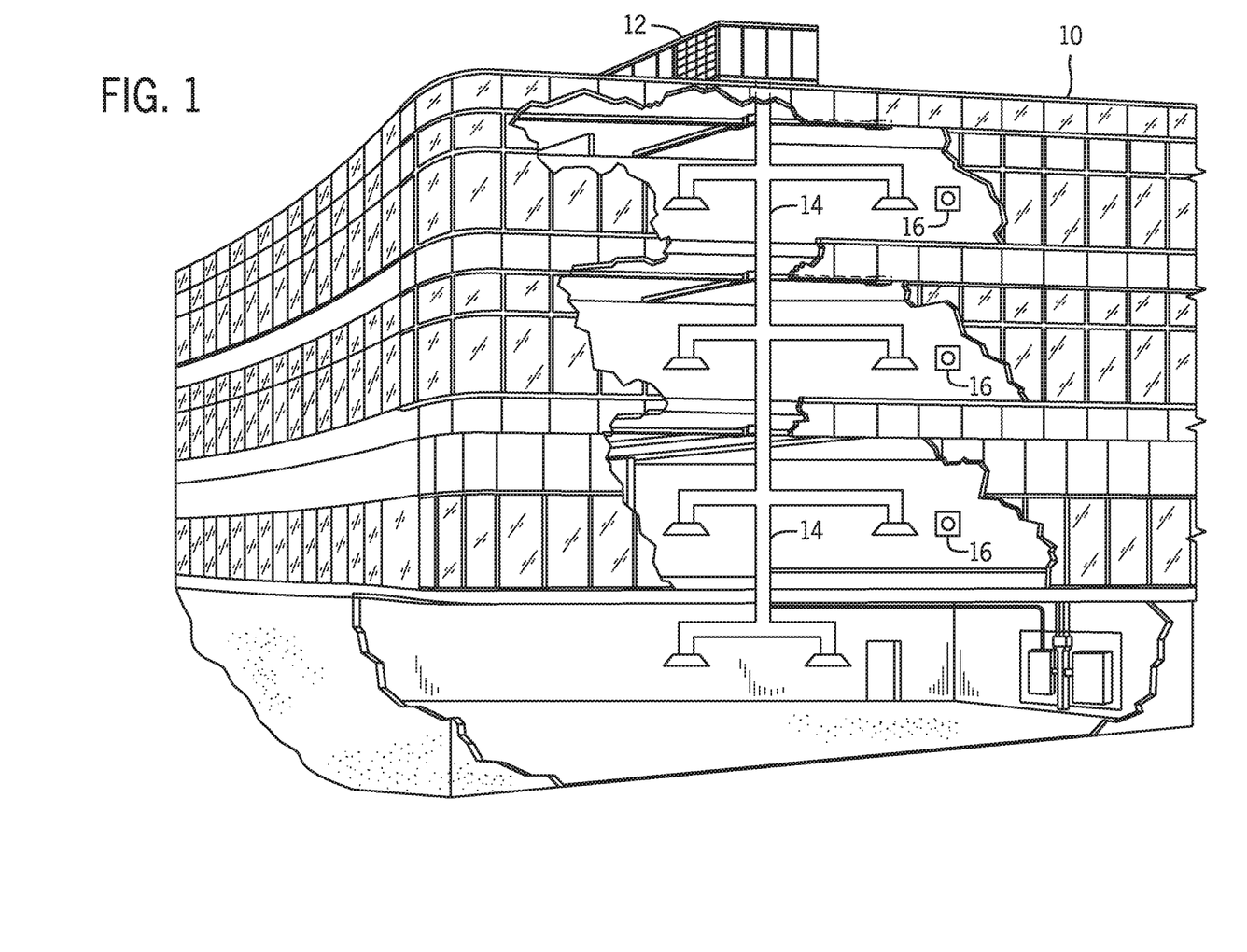
FIG. 1 is a schematic of an environmental control for building environmental management that may employ one or more HVAC units, in accordance with embodiments of the present disclosure.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
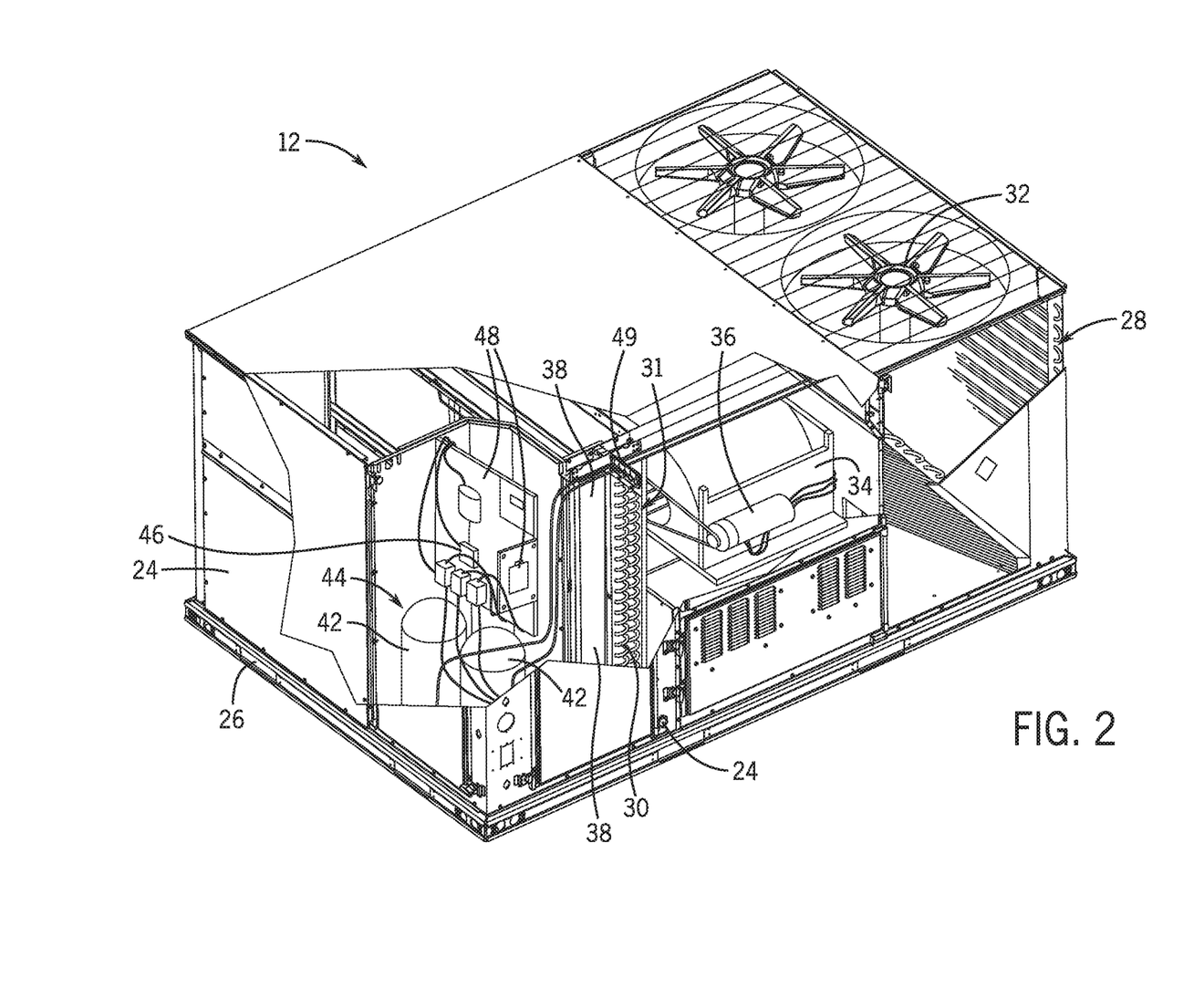
FIG. 2 is a perspective view of an embodiment of the environmental control system of FIG. 1, in accordance with embodiments of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms (one or more being referred to herein separately or collectively as the control device 16). The control circuitry may be configured to control operation of the equipment, provide alarms, and monitor safety switches. Wiring 49 may connect the control board 48 and the terminal block 46 to the equipment of the HVAC unit 12.

Figure 3:
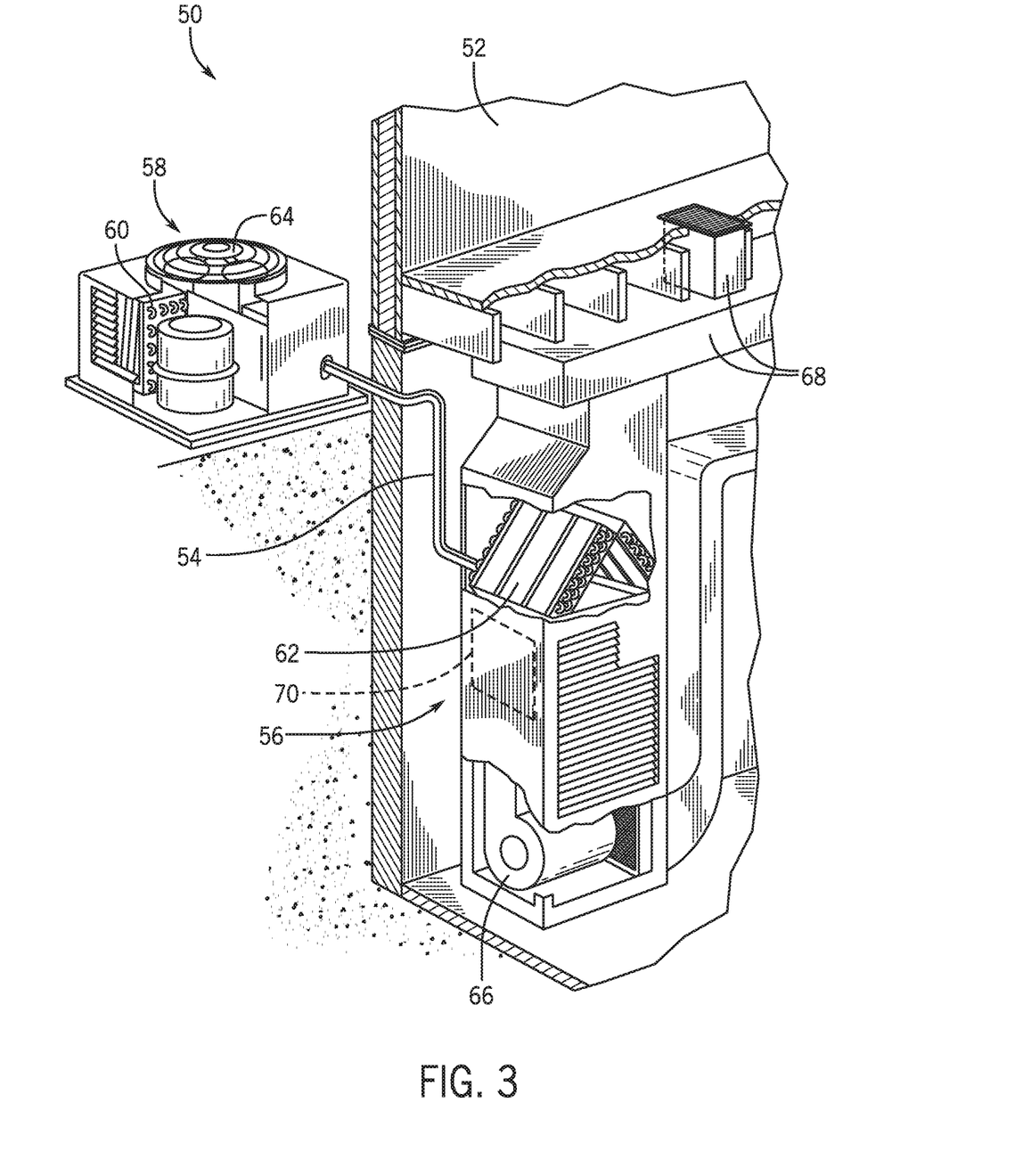
FIG. 3 is a schematic of a residential heating and cooling system, in accordance with the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat (plus a small amount), the residential heating and cooling system 50 may become operative to refrigerate additional air for circulation through the residence 52. When the temperature reaches the set point (minus a small amount), the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52.

Figure 4:
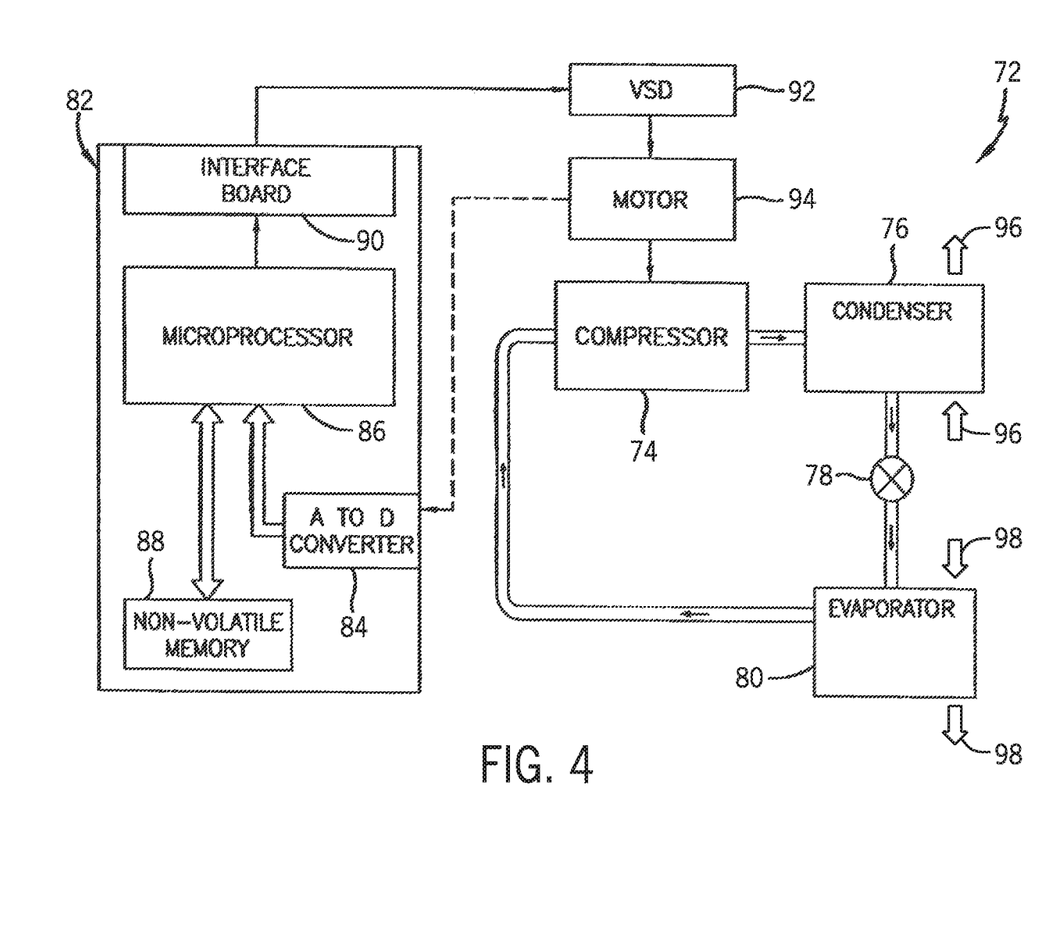
FIG. 4 is a schematic of an embodiment of a vapor compression system that can be used in any of the systems of FIGS. 1-3, in accordance with the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As set forth above, present embodiments are applicable to the HVAC unit 12 and the residential heating and cooling system 50, both of which include a furnace that can generate condensate during operation. As an example, in the HVAC unit 12, to improve the efficiency of the condensing furnace, a secondary heat exchanger recovers additional heat from the combustion products to provide heat to the building 10. Recovering additional heat from the exhaust gas in the secondary heat exchanger results in condensation of water vapor in the combustion products, thereby generating a condensate. As discussed in further detail below, the condensing furnace is fluidly coupled to a condensate removal system used to remove the condensate from the HVAC unit 12 or the residential heating and cooling system 50. The disclosed condensate removal system removes the condensate without the use of drainage pipes that may blocked when ambient temperatures are at or below 0° C. (32° F.) due, in part, to freezing of the condensate in the drainage pipes. To facilitate discussion, the condensate removal system described herein is presented in the context of its use with the HVAC unit 12. However, the condensate removal systems described herein may also be used in combination with the residential heating and cooling system 50.

Figure 5:
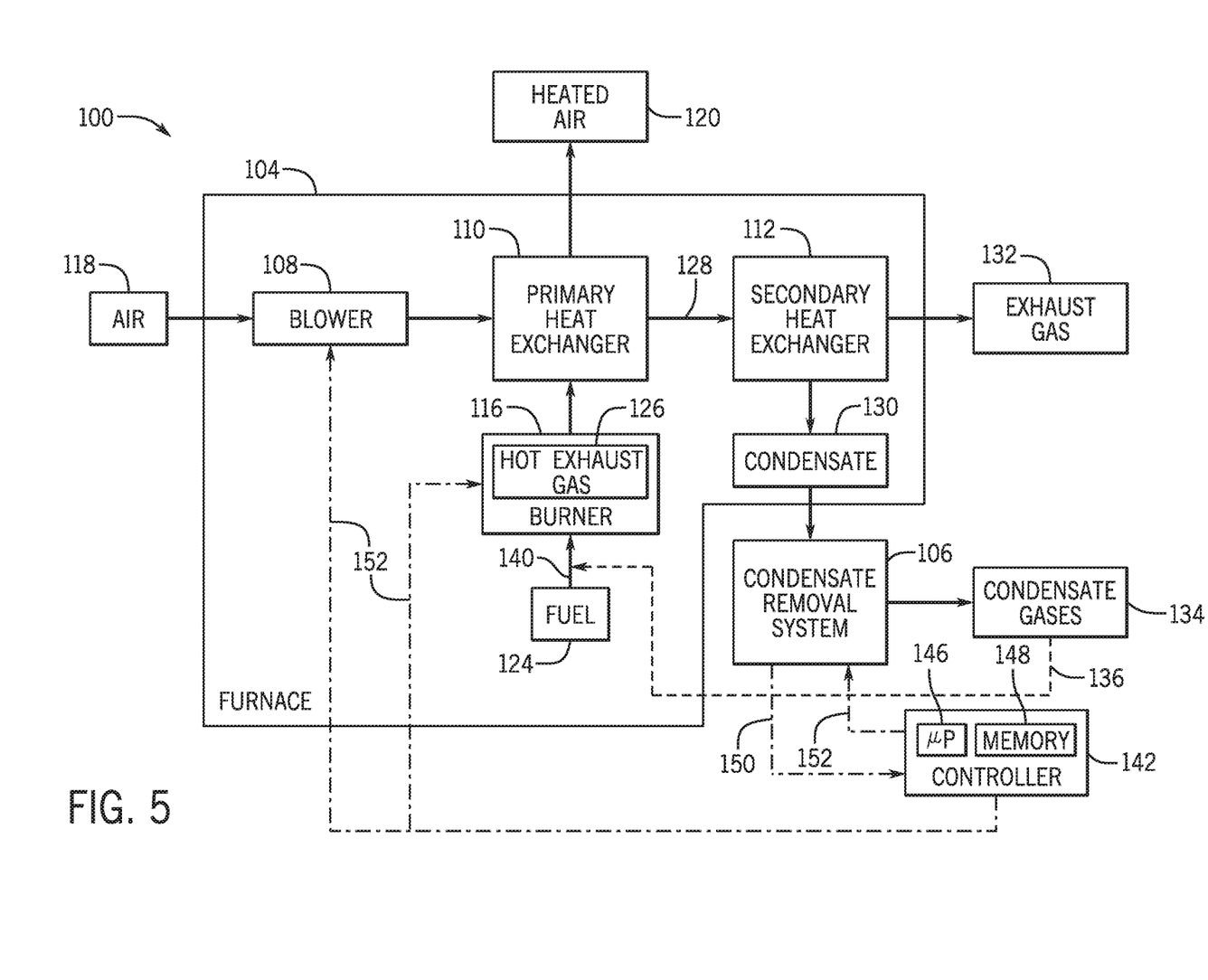
FIG. 5 is a block diagram of an embodiment of the rooftop unit having a condensate removal system coupled to the condensing furnace, in accordance with embodiments of the present disclosure.

FIG. 5 is a block diagram of an embodiment of a rooftop unit 100 of the HVAC unit 12 having the condensing furnace 104 and a condensate removal system 106 fluidly coupled to the condensing furnace 104 that facilitates removal of condensate from the rooftop unit 100 without using drainage pipes. In the illustrated embodiment, the condensate removal system 106 is disposed within the rooftop unit 100 such that it is separate from the condensing furnace 104. However, in other embodiments, the condensate removal system 106 is disposed within the condensing furnace 104. That is, the condensate removal system 106 forms part of the condensing furnace 104. The condensing furnace 104 includes a blower 108, a primary heat exchanger 110, a secondary heat exchanger 112, and a burner 116 that allow heating of air 118 that is used to heat the building 10. For example, in operation, the blower 108 draws the air 118 into the condensing furnace 104. The air 118 is heated by the primary heat exchanger 110 within the condensing furnace 104, and heated air 120 is released from the condensing furnace 104 into the air distribution system to provide heat to the building 10. For example, the burner 116 receives and burns a fuel 124 (e.g., natural gas), which generates a hot exhaust gas 126 that is used to deliver heat to the primary heat exchanger 110. The primary heat exchanger 110 absorbs heat from the hot exhaust gas 126, thereby generating a first cooled hot exhaust gas 128. The heat recovered from the hot exhaust gas 126 by the primary heat exchanger 110 may be used to heat the air 118. For example, the blower 108 directs the air 118 across the primary heat exchanger 110, where the air 118 absorbs the heat delivered to the primary heat exchanger 110 by the hot exhaust gas 126 to generate the heated air 120.

The efficiency of the condensing furnace 104 may be improved by recovering additional heat from the first cooled exhaust 54. In this way, the condensing furnace 104 may operate at an efficiency of 82-84% or more. That is, the condensing furnace 104 may recover at least 82-84% of the heat from the hot exhaust gas 126. Accordingly, the first cooled hot exhaust gas 128 may be directed to the secondary heat exchanger 112. Similar to the primary heat exchanger 110, the secondary heat exchanger 112 absorbs heat from the first cooled hot exhaust gas 128, and generates a condensate 130 and a second cooled exhaust gas 132. The second cooled exhaust gas 132 may be released from the condensing furnace 104, for example, via vent, the condensate 130 may be further processed in the condensate removal system 106 before being released from the condensing furnace 104.

As discussed above, certain existing rooftop units for HVAC systems include a drainage system that collects and drains condensate generated in the condensing furnace using drainage pipes that feed the condensate from the condensing furnace to a drain. However, the drainage pipes are generally exposed to ambient temperatures that may affect proper drainage of the condensate and operation of the HVAC system. For example, during cold weather, ambient temperatures may fall below 0° C. Ambient temperatures below 0° C. may cause the condensate to solidify (e.g., freeze) in the drainage pipes, thereby blocking removal of the condensate from the condensing furnace. Accordingly, the drainage pipes may need to be heated to increase a temperature of the condensate and facilitate removal. However, heating the drainage pipes may decrease the overall efficiency of the condensing furnace. Additionally, when the condensate solidifies, the condensate expands. Expansion of the condensate may fracture the drainage pipes and/or other components of the drainage system. Moreover, certain existing condensing furnaces that used drainage system to remove the condensate may be unable to operate at an efficiency greater than 82-84% because the drainage system may be unable to effectively and efficiently remove the amount of condensate generated when the condensing furnace operates at 90% efficiency. However, by using the condensate removal system 106 disclosed herein, the condensate 130 may be removed from the condensing furnace 104 without the use of drainage pipes.

To provide enhanced efficiency for the condensing furnace 104, the condensate removal system 106 may decompose the condensate 130 using an electrolytic process that splits water molecules (e.g., $H_2O$) and generates condensate gases 134. As used herein, the term "condensate gases" is intended to denote a gaseous mixture of hydroxide ions ($OH^-$) and proton ions ($H^+$) (e.g., HHO or HO), hydrogen ($H_2$), oxygen ($O_2$), and $OH^-$. The condensate gases 134 may be released from the condensate removal system 106 via a vent that directs the condensate gases 134 away from the HVAC system 10 and the building 10. As such, reliance on a drainage system to remove the condensate may be mitigated or all together avoided, and the condensing furnace may operate at an efficiency of greater than 90%. In certain embodiments, at least a portion of the condensate gases 134 may be fed to the burner 116 via a conduit 136. For instance, the condensate gases 134 may be bubbled into a fuel line 140 that supplies the fuel 124 to the burner 116. Alternatively or additionally, the condensate gases 134 generated in the condensate removal system may be used as an oxidant for combustion of the fuel 124 in the burner 116. Therefore, the efficiency of the HVAC system 10 may be further improved.

As set forth above, the condensate 130 generally includes a mixture of water ($H_2O$) and carbon dioxide ($CO_2$). The condensate removal system 106 may apply an electric current through the condensate 130 to decompose the water in the condensate 130 into hydrogen ($H_2$) gas and oxygen ($O_2$) gas and generate the condensate gases 134 (e.g., a mixture of $H_2$ and $O_2$ gases). In this way, the condensate 130 may be removed from the condensing furnace 104 as a gas rather than a liquid, which may solidify at temperatures below 0° C. and affect the overall operation of the HVAC system 10. As discussed in further detail below, with reference to FIG. 6, the condensate removal system 106 includes one or more electrodes that allow electrolysis of the condensate 130 to generate the condensate gases 134.

As illustrated in FIG. 2, the HVAC system 10 includes a controller 142 that monitors and control operation of the HVAC system 10. For example, the controller 142 may operate flow control devices (e.g., valves, pumps, blowers) to control fluid flow between different system components. The controller 142 may include a distributed control system (DCS) or any computer-based control system that is fully or partially automated. For example, the controller 142 may be any device employing a general purpose or an application-specific processor 146 and memory circuitry 148 storing instructions related to temperature and condensate control. The memory circuitry 148 may also store temperature and pressure thresholds of the condensate 130 in the condensate removal system 106, and acceptable levels of the condensate 130. In addition, the memory circuitry 148 may include instructions and algorithms for determining a temperature of the condensate 130 and/or a pressure of the condensate gases 134 within the condensate removal system 106 based on an input signal 150 from one or more sensors disposed within the condensate removal system 16. The instructions may also include activating one or more components of the condensate removal system 16 based on the temperature, pressure, and levels of the condensate 130 within the condensate removal system 16. For example, based on the input signal 150, the controller 142 may transmit an output signal 152 to the condensate removal system 106. The output signal 152 may activate a power source that provides an electric current to components of the condensate removal system 106 such as, but not limited to, one or more electrodes, one or more heaters, and/or a pressure relief valve (e.g., a check valve). The controller 142 may also transmit the output signal 152 to other components of the condensing furnace 104, such as the unit controller 76 and the burner 116, to control operation of the condensing furnace 104. The processor 146 may include one or more processing devices, and the memory circuitry 148 may include one or more tangible, non-transitory, machine-readable media collectively storing instructions executable by the processor 146 to perform the methods and control actions described herein.

The machine-readable media can be any available media other than signals that can be accessed by the processor 146 or by any general purpose or special purpose computer or other machine with a processor. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor 146 or by any general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions includes, for example, instructions and data which cause the processor 146 or any general purpose computer, special purpose computer, or special purpose processing machine to perform a certain function or group of functions, such as measuring the temperature of the condensate 130 and the pressure within the condensate removal system 106.

Figure 6:
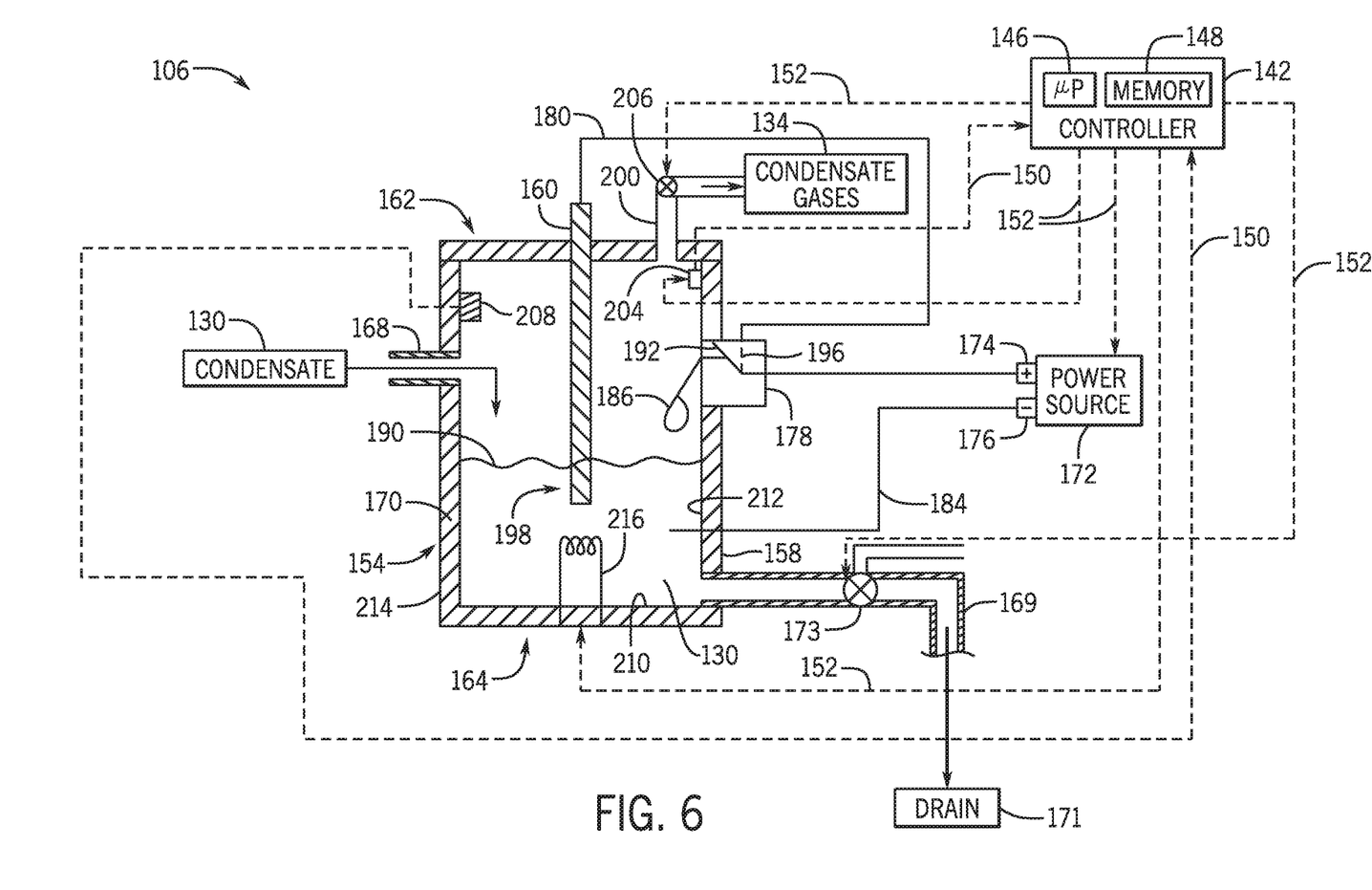
FIG. 6 is a diagram of an embodiment of the condensate removal system of FIG. 5, in accordance with embodiments of the present disclosure.

As discussed above, the condensate removal system 106 removes the condensate 130 without the use of drainage pipes used in certain existing HVAC rooftop units. FIG. 6 illustrates an embodiment of the condensate removal system 106 having an electrolyzer that converts the condensate 130 into the condensate gases 134. For example, the condensate removal system 106 includes an electrolyzer 154 having a container 158 and one or more electrodes 160. The one or more electrodes 160 may be any suitable electrode that facilitates electrolysis of water ($H_2O$). By way of non-limiting example, the one or more electrodes 160 includes graphite electrodes, stainless steel electrodes, platinum electrodes, or iridium electrodes. The one or more electrodes 160 extend from a top end 162 of the container 158 toward a bottom end 164 of the container 158 such that at least a portion of the one or more electrodes 160 are in direct contact with the condensate 130, as discussed in further detail below. In certain embodiments, the electrodes 160 may be attached through a sidewall or a bottom of the electroylzer 154.

The container 158 includes an inlet 168 that receives the condensate 130 generated from the heat exchange between the first cooled hot exhaust gas 128 and the secondary heat exchanger 112. In the illustrated embodiment, the inlet 168 is positioned on a sidewall 170 of the container 158. However, the inlet 168 may be positioned at any other location on the container 158, such as at the top end 162 of the container 158. The inlet 168 may be fluidly coupled to a condensate trap or pan that is adjacent to the secondary heat exchanger 112 and receives the condensate 130 generated during heat exchange between the first cooled hot exhaust gas 128 and the secondary heat exchanger 112. The condensate trap or pan may direct the condensate 130 to the inlet 168 of the container 158. In certain embodiments, a pump may be used to motivate a flow of the condensate 130 from the condensate trap or pan into the container 158. In other embodiments, the condensate removal system 106 may be positioned such that the condensate 130 flows toward the inlet 94 via gravitational forces. For example, the condensate removal system 106 may be positioned below the secondary heat exchanger 112. The container 158 is configured to collect the condensate 130, continuously or intermittently, during operation of the HVAC system 10. While in the illustrated embodiment the container 158 is shown as having a rectangular shape, the container 158 may have any other suitable geometric shape sized to fit within the rooftop unit 100 or the condensing furnace 104. The container 158 may be fabricated from suitable polymeric and/or metallic materials. For example, the container 158 may be fabricated from polyvinyl chloride (PVC), polyethylene, polypropylene, polyethylene terephthalate, polycarbonate, aluminum, stainless steel, or any other suitable material and combinations thereof.

The container 158 also includes an outlet 169 that may allow the condensate 130 collected in the container 158 to flow to a drain 171 during operation of the rooftop unit 100. For example, in embodiments where the electrolyzer 154 is not activated by a float device (e.g., float device 186), as discussed in further detail below. The outlet 169 may include a valve 173 that controls a flow of the condensate 130 from the container 158 to the drain. The valve 173 may be a solenoid valve or any other suitable valve that controls a flow of the condensate 130 from the container 158 to the drain 171. The controller 142 may transmit the output signal 152 to control operation of the valve 173 and allow or block a flow of the condensate 130 from the container 158 to the drain 171.

The electrolyzer 154 removes the condensate 130 from the condensate removal system 16 via an electrolysis process that decomposes (or splits) water ($H_2O$) in the condensate 130 into the condensate gases 134 (e.g., $H_2$ gas and $O_2$ gas). The condensate removal system 16 includes a power source 172 that provides an electric current (e.g., a direct current (DC)) used by the one or more electrodes 160 to electrolyze the condensate 130 and generate the condensate gases 134. For example, the power source 172 includes a positive terminal 174 and a negative terminal 176. The positive terminal 174 may be electrically coupled to an activation switch 178 (e.g., a float switch) that delivers electric current 180 to the one or more electrodes 160 once the condensate 130 reaches a predetermined level in the container 158. That is, the activation switch 178 is electrically positioned between the power source 172 and the one or more electrodes 160. The negative terminal 176 may be used to ground the electric circuit created between the power source 172 and the activation switch 178 by coupling the negative terminal 176 to the container 158, as shown by line 184, or any other suitable component of the HVAC system 10.

In the illustrated embodiment, the activation switch 178 includes a mechanical or electrical float device 186 (e.g., a hinged float or other suitable float device) that detects where a certain level 190 of the condensate 130 has collected within the container 158, and activates the one or more electrodes 160 based on the level 190 of the condensate 130. For example, as discussed above, the condensing furnace 104 generates the condensate 130 via heat exchange between the first cooled hot exhaust gas 128 and the secondary heat exchanger 112. The condensate 130 is collected within the container 158 and fills at least a portion of the container 158 during operation of the HVAC system 10. Over time, the level 190 of the condensate 130 in the container 158 increases. When the level 190 of the condensate 130 reaches the mechanical or electrical float device 186, the mechanical or electrical float device 186 activates a switch 192 that closes the electrical circuit between the power source 172 and the one or more electrodes 160, as shown by dashed line 196. At least a portion 198 of the one or more electrodes 160 is positioned below the level 190 such that the portion 198 is in direct contact with the condensate 130. Accordingly, after the switch 192 closes the electrical circuit, the one or more electrodes 160 deliver the electric current 180 from the power source 172 to the condensate 130 at a voltage suitable for electrolysis of the condensate 130 (e.g., liquid water). In this way, the condensate 130 may be converted into the condensate gases 134 (e.g., a mixture of $H_2$ and $O_2$ gas), which may be released from the container 158 through a vent 200. Accordingly, the condensate removal system 106 may remove the condensate 130 without the use of drainage pipes. Removing the condensate 130 in the form of the condensate gases 134 mitigates problems associated with solidification of liquid condensate in existing condensate drainage systems when ambient temperatures are at or below 0° C.

In certain embodiments, the condensate removal system 106 may include one or more sensors that monitor conditions within the container 158 and/or one or more properties of the condensate 130, as well as features configured to regulate certain properties of the condensate 130. For example, the condensate removal system 106 may include a pressure sensor 204 that monitors a pressure within the container 158. In embodiments where the vent 200 includes a valve 206 that blocks re-entry of the released condensate gases 134 and/or entry fluids into the container 158 through the vent 200, the valve 206 may open to release the condensate gases 134 from the container 158 after a pressure within the container 158 reaches a pressure threshold. For example, the pressure sensor 204 may provide the input signal 150, which is representative of the pressure within the container 158, to the controller 142. The controller 142 may determine if the pressure within the container 158 is at or above the pressure threshold (e.g., a pressure that is at or above atmosphere). In response to determining that the pressure within the container 158 is above the pressure threshold, the controller transmits the output signal 152 to the valve 206 instructing the valve 206 to open, thereby releasing the condensate gases 134 and decreasing the pressure within the container 158. In other embodiments, the valve 206 may be a pressure relief valve that is set to a pressure threshold and activates (opens) once the internal pressure of the container 158 reaches a certain amount.

In one embodiment, the valve 206 may control a flow rate of the condensate gases 134 provided to the burner 116 for combustion. For example, the conduit 136 is fluidly coupled to the vent 200 and extends between the vent 200 and the fuel line 140 of the burner 116 (see, e.g., FIG. 2). The conduit 136 provides at least a portion of the condensate gases 134 to the burner 116 for combustion. The condensate gases 134 may be bubbled into the fuel line 140 that directs the fuel 124 to the burner 116 or may be supplied to the burner 116 via an inlet separate from a fuel inlet that provides the fuel 124 to the burner 116. Supplying at least a portion of the combustion gases 68 to the burner 116 for use in combustion of the fuel 124 may increase the overall efficiency of the condenser furnace 16 and decrease an amount of discharge (e.g., the combustion gases 68) exiting the HVAC system 10.

In certain embodiments, the condensate removal system 106 may include one or more temperature sensors 208 that monitor a temperature of the condensate 130 within the container 158 and/or a temperature of the container 158. The one or more temperature sensors 208 may be positioned at any location of the condensate removal system 106 that allows the temperature of the condensate 130 and/or the container 158 to be measured. For example, the temperature sensor 146 may be disposed within the container 158 on an interior bottom wall surface 210 or an interior sidewall surface 212 near, or adjacent to, the inlet 168 of the electrolyzer 154. In certain embodiments, the one or more temperature sensors 208 may be disposed external to the container 158 such as, on an exterior wall surface 214 of the container 158. The one or more temperature sensors 208 may indirectly measure a temperature of the condensate 130, for example, by measuring a temperature of the container 158. The one or more temperature sensors 208 may transmit the input signal 150 to the controller 142. The controller 142 may use the input signal 150 to determine a temperature of the condensate 130 and/or the container 158. In embodiments where the temperature of the condensate 130 and/or the container 158 is below a temperature threshold, the controller may transmit the output signal 152 to a heater 216 within the container 158, thereby activating the heater 216 and heating the condensate 130. The heater 216 heats the condensate 130 to a temperature above the temperature threshold to mitigate solidification (e.g., freezing) of the condensate 130 within the container 158 during operation (e.g., on/off cycles) of the HVAC system 16 or when the ambient temperature around the rooftop unit 100 is such that freezing of the condensate 130 may occur. In certain embodiments, the temperature threshold may be between approximately 0° C. and approximately 10° C. The heater 216 may include an electric heater that is operated using the power source 172 or any other suitable power source. In one embodiment, the heater 216 may operate continuously or intermittently, depending on the ambient temperatures and the temperature of the condensate 130.

Figure 7:
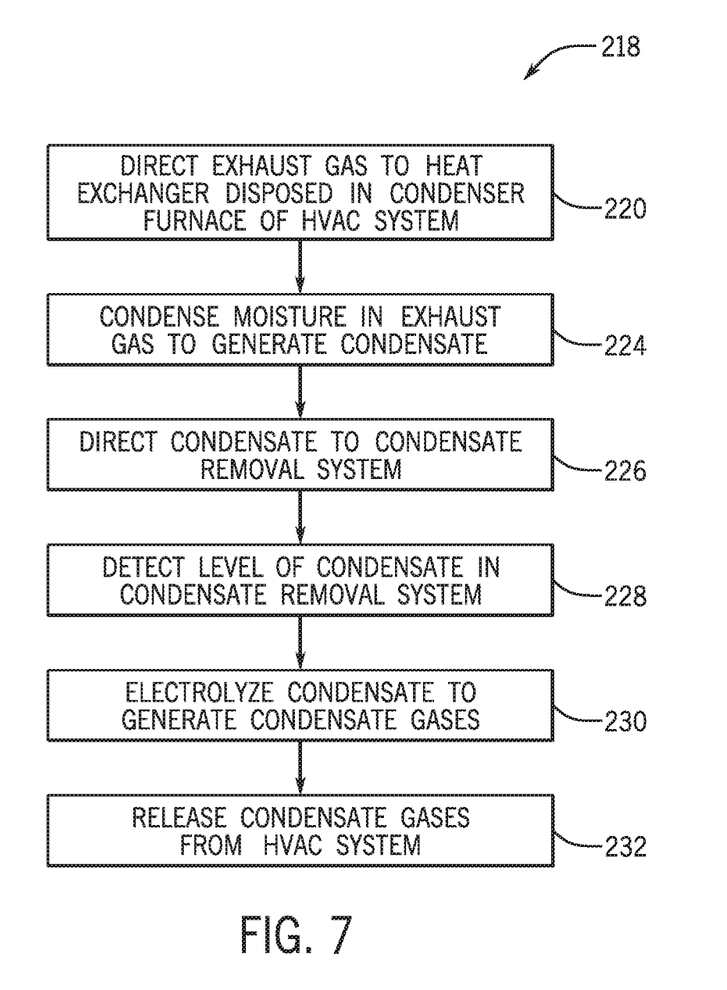
FIG. 7 is a flow diagram of an embodiment of a method that may be used to remove condensate from the environmental control system using the condensate removal system of FIG. 6.

Present embodiments also include a method that utilizes the condensate removal system 106 to remove the condensate 130 from the HVAC system 10. As should be noted, certain steps in the method may be stored in the memory circuitry 148 and are executable by the processor 146 of the controller 142. FIG. 7 illustrates a flow diagram of a method 218 by which the condensate removal system 106 removes the condensate 130 generated in the condensing furnace 104. The method 160 includes directing the first exhaust gas 54 to the secondary heat exchanger 112 (block 220), and condensing moisture within the first cooled hot exhaust gas 128 to generate the condensate 130 (block 224). As discussed above, the secondary heat exchanger 112 recovers additional heat from the cooled exhaust gas 54 that may be used to provide additional heat to the building 10. In this way, the condensing furnace 104 may operate at an efficiency of 82-84% or more. The secondary heat exchanger 112 recovers enough heat from the first cooled hot exhaust gas 128 that the moisture within the first cooled hot exhaust gas 128 condenses, thereby generating the condensate 130.

The method 160 also includes directing the condensate 130 to the condenser removal system 30 (block 226). For example, as the condensate 130 forms during cooling of the first cooled hot exhaust gas 128 by the secondary heat exchanger 112, the condensate 130 flows through the inlet 168 of the condensate removal system 106 and into the container 158. The container 158 collects the condensate 130 before removal from the HVAC system 10.

The method 160 also includes detecting a level of the condensate 130 within the container 158 (block 228), and electrolyzing the collected condensate 130 when the condensate 130 reaches a certain level within the container 158 to generate the condensate gases 134 (block 230). For example, as discussed above, the condensate removal system 106 includes the activation switch 178 that opens and closes an electric circuit between the one or more electrodes 160 and the power source 172. The level of the condensate 130 is detected via the mechanical or electrical float device 186 associated with the activation switch 178. For example, as the condensate 130 is collected in the container 158 of the condensate removal system 106, the level 190 of the condensate 130 increases. Once the level 190 of the condensate 130 reaches a threshold level, the mechanical or electrical float device 186 activates the switch 192 to close the electric circuit between the power source 172 and the one or more electrodes 160. The threshold level may be a condensate level at which the condensate 130 contacts the mechanical or electrical float device 186. In this way, the power source 172 delivers the electric current 180 to the one or more electrodes 160

The method 160 also includes releasing the condensate gases 134 from the condensate removal system 106 (block 232). For example, the condensate gases 134 may be released from the container 158 via the vent 200. In certain embodiments, at least a portion of the condensate gases 134 may be directed to the fuel line 140 and fed to the burner 116. The condensate gases 134 may react with the fuel 124 to generate the hot exhaust gas 126. In this way, the overall efficiency of the condensing furnace 104 may be increased compared to condensing furnaces that do not include the condensate removal system 106. Additionally, by using the condensate removal system 106, the condensate 130 may be removed from the HVAC system 10 without the use of drainage pipes. Accordingly, the condensate removal system 106 may allow the condensing furnace 104 to operate at an efficiency of 90% or more due, in part, to the efficient removal of the condensate 130 by the condensate removal system 106.

As set forth above, the condensate removal system of the present disclosure may provide one or more technical effects useful in the operation of HVAC systems and removal of condensate generated within condensing furnaces of HVAC systems. For example, embodiments of the present approach may allow removal of the condensate from condensing furnaces with the use of drainage pipes that are currently used in existing systems. By specific example, the condensing furnace may include a condensate removal system that includes an electrolyzer that decomposes liquid condensate (e.g., water) into condensate gases (e.g., hydrogen ($H_2$) and oxygen ($O_2$)) that may be vented and released from the HVAC system. Accordingly, problems associated with freezing of condensate within drainage pipes when ambient temperatures are at or below 0° C. may be mitigated. The technical effects and technical problems in the specification are examples and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode, or those unrelated to enablement). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilating, and/or air conditioning (HVAC) system, comprising:
  a condensing furnace; and
  a condensate removal system associated with the condensing furnace, wherein the condensate removal system comprises an electrolyzer comprising:
    a container configured to collect a condensate generated from an exhaust gas produced in the condensing furnace;
    an electrode disposed within the container and configured to apply an electric current to the condensate to electrolyze the condensate and thereby generate condensate gases including oxygen and hydrogen; and
    a vent configured to direct the condensate gases including oxygen and hydrogen from the container toward atmosphere.

2. The HVAC system of claim 1, wherein the condensate removal system comprises a switch electrically positioned between the electrode and a power source configured to generate the electric current.

3. The HVAC system of claim 2, wherein the switch comprises a mechanical or electrical float device disposed within the container and configured to close an electric circuit between the power source and the electrode when the condensate is in contact with the mechanical or electrical float device.

4. The HVAC system of claim 1, wherein the condensate removal system comprises a heater disposed within the container and configured to heat the condensate.

5. The HVAC system of claim 1, wherein the container comprises a valve coupled to the vent and configured to release the condensate gases including oxygen and hydrogen from the container and through the vent, wherein the valve controls release of the condensate gases including oxygen and hydrogen based on a pressure within the container.

6. The HVAC system of claim 1, wherein the condensate removal system comprises a temperature sensor coupled to the container to indirectly measure a temperature of the condensate.

7. The HVAC system of claim 6, wherein the temperature sensor is positioned on the container such that the temperature sensor does not contact the condensate.

8. The HVAC system of claim 6, wherein the temperature sensor is positioned adjacent to an inlet of the electrolyzer.

9. The HVAC system of claim 1, wherein the condensing furnace comprises a first heat exchanger and a second heat exchanger disposed downstream from the first heat exchanger, wherein the condensate removal system is disposed downstream from the second heat exchanger, and wherein the second heat exchanger is configured to generate the condensate.

10. The HVAC system of claim 1, comprising a controller configured to control operation of the HVAC system, wherein the controller comprises:
  one or more tangible, non-transitory, machine-readable media collectively storing one or more sets of instructions; and
  one or more processing devices configured to execute the one or more sets of instructions to:
    monitor a temperature of the condensate, the container, or both, using a temperature sensor coupled to the electrolyzer; and
    activate a heater disposed within the container and configured to heat the condensate in response to determining that the temperature of the condensate is below a temperature threshold.

11. The HVAC system of claim 1, comprising a controller configured to control operation of the HVAC system, wherein the controller comprises:
- one or more tangible, non-transitory, machine-readable media collectively storing one or more sets of instructions; and
- one or more processing devices configured to execute the one or more sets of instructions to:
  - monitor a pressure within the electrolyzer using a pressure sensor coupled to the container; and
  - open a valve disposed on a vent of the container in response to determining that the pressure within the container is above a pressure threshold.

12. The HVAC system of claim 1, wherein the condensate removal system is diposed disposed within the condensing furnace.

13. The HVAC system of claim 1, wherein the HVAC system comprises a rooftop unit, and wherein the condensate removal system is disposed within the rooftop unit.

14. A heating, ventilating, and/or air conditioning (HVAC) system, comprising:
- a condensate removal system associated with a condensing furnace of the HVAC system and comprising an electrolyzer, wherein the electrolyzer comprises:
  - a container having an inlet and an outlet, wherein the inlet is configured to receive and enable the container to collect a condensate generated within a section of the condensing furnace having a heat exchanger; and
  - an electrode disposed within the container and configured to apply an electric current to the condensate, wherein the electric current is configured to decompose the condensate to generate condensate gases including oxygen and hydrogen, and wherein the outlet of the container is fluidly coupled to a vent configured to direct the condensate gases including oxygen and hydrogen toward atmosphere.

15. The HVAC system of claim 14, comprising a switch electrically coupled to the electrode and a power source configured to generate the electric current, wherein the switch is configured to transmit the electric current from the power source to the electrode in its closed state.

16. The HVAC system of claim 15, wherein the switch comprises a mechanical or electrical float device disposed within the container and configured to detect a threshold level of the condensate within the container and to close an electric circuit between the power source and the electrode when the threshold level of the condensate is reached.

17. The HVAC system of claim 14, comprising a heater disposed within the container and configured to heat the condensate when a temperature of the condensate, the container, or both is below a threshold temperature.

18. The HVAC system of claim 14, comprising a temperature sensor coupled to the container to indirectly measure a temperature of the condensate.

19. The HVAC system of claim 14, comprising a pressure sensor coupled to the container and configured to measure a pressure within the container.

20. The HVAC system of claim 14, comprising a valve configured to control release of the condensate gases including oxygen and hydrogen via the outlet based on a pressure within the container.

21. The HVAC system of claim 20, wherein the valve is a check valve set to a threshold pressure that is at or above an atmospheric pressure.

22. A method, comprising:
- directing a condensate to a condensate removal system associated with a condensing furnace of a heating, ventilating, and/or air conditioning (HVAC) rooftop unit, wherein the condensate is generated from cooling an exhaust gas produced from combustion of a fuel within a burner of the condensing furnace, wherein the condensate removal system comprises an electrolyzer comprising a container, an electrode, and a vent, and wherein the container is configured to collect the condensate;
- applying an electric current to the condensate in the container using the electrode to decompose the condensate and thereby generate condensate gases including oxygen and hydrogen; and
- releasing the condensate gases including oxygen and hydrogen through the vent and into atmosphere.

23. The method of claim 22, wherein applying electric current comprises activating a switch via a mechanical or electrical float device responsive to a level of the condensate in the container, wherein the switch is configured to communicatively coupled to a power source configured to generate the electric current and to the electrode.

24. The method of claim 23, comprising closing an electric circuit between the power source and the electrode via the switch when the mechanical or electrical float device contacts the condensate.

25. The method of claim 22, comprising monitoring a temperature of the condensate, the container, or both using a temperature sensor coupled to the container, and activating a heater disposed within the container when a temperature of the condensate, the container, or both is below a threshold temperature.

26. The method of claim 22, wherein releasing the condensate gases including oxygen and hydrogen from the container comprises activating a check valve disposed at an outlet of the container when an internal pressure of the container is above a threshold pressure.

* * * * *